United States Patent [19]

Rieser

[11] 4,227,906

[45] Oct. 14, 1980

[54] ENVIRONMENTAL CONTROL FOR MINERAL FIBER-FORMING

[75] Inventor: Elmer P. Rieser, Pickerington, Ohio

[73] Assignee: Owens-Corning Fiberglas Corporation, Toledo, Ohio

[21] Appl. No.: 703,722

[22] Filed: Jul. 9, 1976

[51] Int. Cl.³ .......................................... C03B 37/02
[52] U.S. Cl. .......................................... 65/2; 65/12; 264/176 F
[58] Field of Search ............... 264/176 F; 65/1–5, 65/12

[56] References Cited

U.S. PATENT DOCUMENTS

| | | | |
|---|---|---|---|
| 2,821,744 | 2/1958 | Spohn et al. | 264/176 F |
| 3,232,730 | 2/1966 | Drummond | 65/12 |
| 3,248,192 | 4/1966 | Millet | 65/16 |
| 3,257,181 | 6/1966 | Stalego | 65/12 |
| 3,905,790 | 9/1975 | Strickland | 65/1 |
| 3,969,099 | 7/1976 | Reese | 65/2 |
| 4,030,901 | 6/1977 | Kaiser | 65/9 |
| 4,033,742 | 7/1977 | Nichols et al. | 65/12 |
| 4,052,183 | 10/1977 | Levesque et al. | 264/176 F |
| 4,105,424 | 8/1978 | Levesque et al. | 425/7 |

FOREIGN PATENT DOCUMENTS

| | | | |
|---|---|---|---|
| 239913 | 5/1960 | Australia | 264/176 F |
| 799381 | 11/1968 | Canada | 264/176 F |
| 40-25172 | 11/1965 | Japan | 264/176 F |
| 44-21169 | 9/1969 | Japan | 264/176 F |
| 51-7218 | 1/1976 | Japan | 65/12 |
| 179874 | 6/1966 | U.S.S.R. | 264/176 F |

Primary Examiner—Jay H. Woo
Attorney, Agent, or Firm—Ronald C. Hudgens; Philip R. Cloutier; Ted C. Gillespie

[57] ABSTRACT

A mineral fiber-forming bushing is disclosed in which sidewalls containing at least one opening extend continuously downwardly from the bushing bottom wall to define a forming chamber beneath the bushing. A fluid is directed toward the bushing bottom wall and the exit of the fluid through the opening is controlled. The control of fluid flow can control the local environmental conditions both within the forming chamber and on the bushing bottom wall.

19 Claims, 1 Drawing Figure

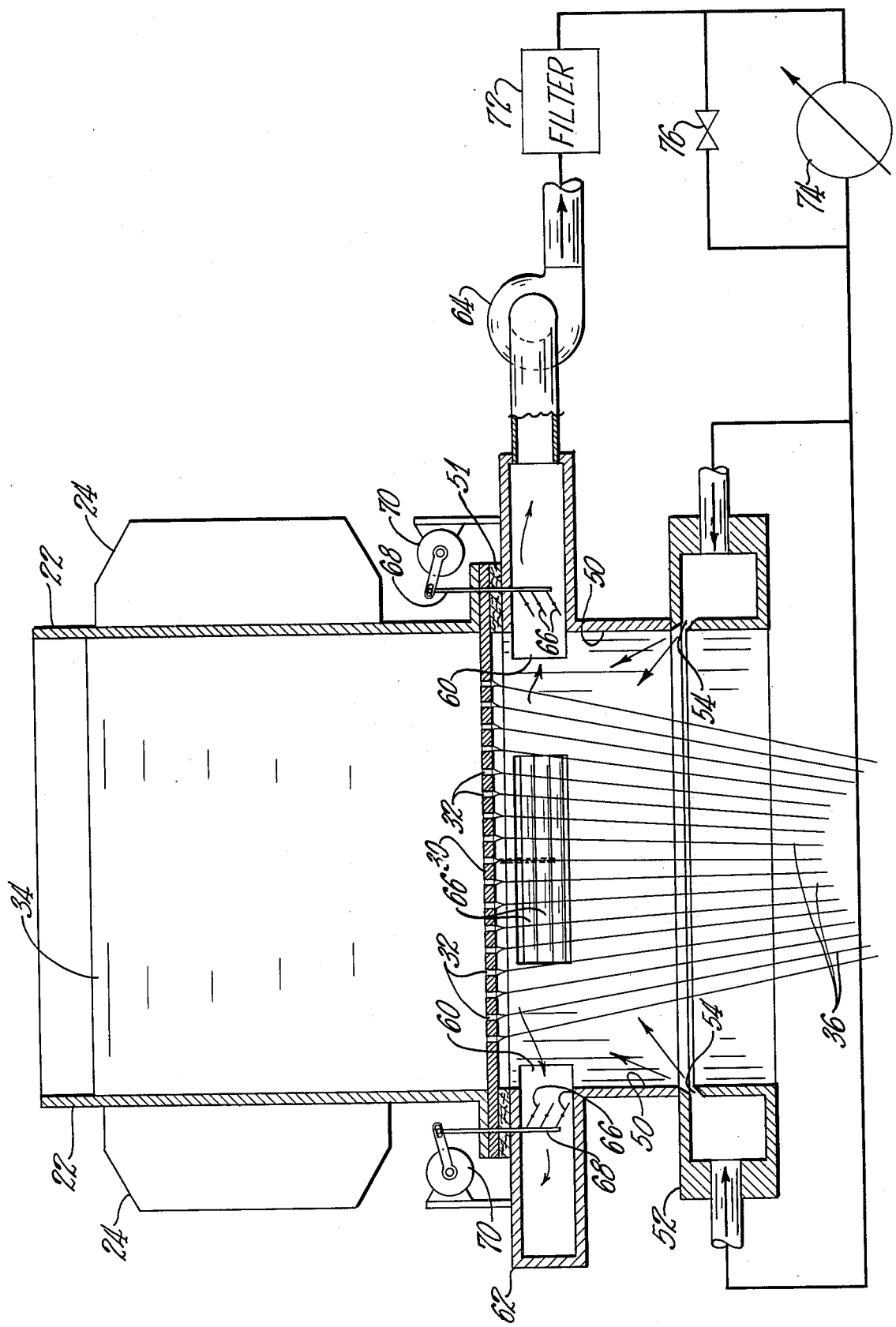

ENVIRONMENTAL CONTROL FOR MINERAL FIBER-FORMING

This invention relates to the manufacture of glass fibers, and more particularly relates to the drawing of glass fibers from an orificed bushing containing molten glass.

One of the limitations associated with the manufacture of glass fibers is the number of fibers which can be drawn from a conventional tipped bushing. Due to the potential for the flooding of molten glass across the face of a bushing a minimum spacing between orifices is required. The area of the bushing bottom wall itself is limited by the properties of available refractory metals. As a practical matter, conventional tipped bushings have been generally limited to on the order of about 2000 orifices.

One proposal to increase the number of orifices possible in a bushing is that of directing a flow of a fluid such as air onto a tipless bushing. The impinging fluid serves to rapidly cool the glass emerging from the orifices and prevent flooding of the glass over the bushing, thereby allowing a much greater number of orifices in a bushing. A glass fiber manufacturing process such as this has been described by Strickland in U.S. Pat. No. 3,907,790. Strickland suggests that the upwardly impinging fluid can serve to prevent pockets of stagnant fluid on the underside of the bushing, and that a portion of the impinged fluid can move laterally outwardly from the orifice area of the bushing bottom wall.

One of the problems associated with the use of a fluid impinging on the bushing bottom wall is that of controlling the flow of the fluid. Some of the fluid travels with the downwardly moving fibers. It is possible that a large amount of the fluid travels outwardly from the point of impingement, and thence downwardly. Eddy currents can result in some areas adjacent the bushing, while other areas can have pockets of stagnant fluid. Peculiarities of particular fluid flow patterns can create temperature variations in the bushing bottom wall itself.

It has been found that the flow of fluid, and therefore the environment in the fiber-forming area, can be controlled, in part, by providing a forming chamber comprised of the bushing bottom wall and sidewalls extending continuously downwardly therefrom, the sidewalls having one or more openings for the exit of fluid. It has also been found that the flow of fluid after it has been directed toward the bushing bottom wall can be further controlled by providing a means for controlling the volume and velocity of the fluid passing through these openings. It has also been found that the temperature pattern on the bushing bottom wall can be affected by controlling the flow of fluid, and that the temperature of localized areas of the bushing bottom wall can be significantly altered by modifying the size and position of the sidewall openings, and the flow of fluid therethrough.

According to this invention there is provided an improved apparatus and method for producing fibers from molten mineral material.

Also, according to this invention there is provided a method of making fibers from molten mineral material comprising attenuating fibers from a fiber-forming bushing having a bottom wall containing orifices, wherein at least one sidewall projects downwardly from the bushing bottom wall to define a forming chamber and wherein there is at least one opening in the sidewall for the exit of fluids, directing a fluid toward the bushing bottom wall, passing a portion of the fluid through the sidewall opening, and recovering the fibers. The volume and velocity of fluid exiting via the opening can be controlled. A plurality of openings can be provided, and each opening can be individually controlled to control the flow of the fluid in the portions of the forming chamber adjacent each opening. A portion of the exited fluid can be returned to the forming chamber and redirected toward the bushing bottom wall.

Also, according to this invention there is provided a fiber-forming bushing having a bottom wall containing orifices, sidewalls extending continuously downwardly from the bottom wall to form an open-bottomed forming chamber, and at least one opening positioned in the sidewalls of the forming chamber for the exit of a fluid. The volume and velocity of fluid passing through the sidewall openings can be controlled. The exited fluid can be recycled and redirected toward the bushing bottom wall.

This invention will be more fully understood by reference to the drawing which is a cross-sectional view of a bushing and environmental control apparatus according to the principles of this invention.

The following description of a specific embodiment of this invention utilizes glass as the fiber-forming material and air as the fluid impinging upon the bushing. It is to be understood that other mineral fiber-forming material can be made utilizing the principles of this invention, and that other fluids, such as carbon dioxide, nitrogen and inert gases can be used as the fluid to be directed toward the bushing bottom wall. It is also to be understood that while a single opening can be employed, the discussion is in terms of a plurality of openings. This description is not intended to be limiting, but rather is offered for purposes of explanation.

The general configuration of the bushing will be as shown in the drawing. In the drawing there is shown bushing 22 adapted with terminals 24 for the supply of electrical power, molten glass 34 being held in the bushing and being drawn as fibers 36 from the bushing through orifices 32 positioned in bushing bottom wall 30. The number of orifices in the bushing bottom wall can be up to 5,000 to 10,000, or more. The filaments are gathered into a strand, not shown, and packaged. While the bushing bottom wall of the preferred embodiment is shown to be flat, it can also be upwardly or downwardly protruding. For example, the bottom wall can be downwardly convex with a smoothly curving surface; alternatively, the bottom wall can be V-shaped with a downwardly protruding apex.

Extending continuously downwardly from all sides of the bushing bottom wall are sidewalls 50. The sidewalls can be electrically insulated from the bushing by insulation member 51. The sidewalls in combination with the bushing bottom wall define an open-bottomed forming chamber, through which the filaments travel. In the preferred embodiment the forming chamber is cylindrically shaped, having a circular cross-section, but other shapes can be used in accordance with the principles of this invention. The forming chamber can have a partial bottom wall provided there is an opening sufficient for the recovery of attenuated fibers.

A portion of the sidewalls can be comprised of air manifold 52. The manifold can have an annular shape, as shown in the drawing, and thus be in conformance with the cylindrical shape of sidewalls 50. Air is supplied to the annular manifold from a source not shown.

Annular manifold opening 54 directs air flowing from the manifold into the forming chamber and onto the bushing bottom wall. The annular manifold and the annular manifold opening of the preferred embodiment can supply a substantially uniform flow of air to the bushing bottom wall. The amount and direction of the air flow can be modified by varying the air pressure within the annular manifold, the size of the annular manifold opening, and the orientation and angle of the annular manifold opening.

While the preferred embodiment has been described as containing an annular manifold and opening for providing air flow to the bushing bottom wall, the principles of this invention can be employed where the air flow is supplied by a single nozzle, or a plurality of nozzles. For example, if a V-bottomed bushing is used, a pair of opposed nozzles can be used to direct a flow of air toward each face of the bushing bottom wall.

The sidewalls have one or more openings 60 which can serve as exits for air within the forming chamber. In the preferred embodiment there are a plurality of openings which are positioned about the circumference of the forming chamber.

The proximity of the openings in the upper sidewall of the forming chamber to the bushing bottom wall can aid in reducing unwanted turbulence in the lower portions of the forming chamber by drawing off air. The openings can be positioned so as to be adjacent those areas of the forming chamber which have flows of air, in order that the impinged air may exit through the openings. For example, if the bushing bottom wall is rectangular it can be advantageous to provide larger sidewall openings proximate the long side of the bushing bottom wall for the exit of air then the openings proximate the short side of the bushing bottom wall.

Air exiting the forming chamber through the openings can pass into a receiving chamber, such as annular air-receiving chamber 62, which, in turn, can be exhausted by fan 64. The fan serves to create a pressure differential across the opening. The amount of air exhausted through the openings can be controlled in part by the speed of the fan.

Air exhausted by the fan can be recycled and returned to the air manifold where it will be redirected toward the bushing bottom wall, as shown schematically in the drawing. Filter 72 can be used to remove impurities and particulate matter. Cooling means 74 and by-pass valve 76 can be employed to condition the recirculated fluid.

The amount of air exiting through the opening can also be controlled by the operation of dampers 66 placed within the openings. The damper can be controlled by any conventional means such as rod 68 and damper operating means 70. By controlling the amount of air drawn through the openings from the forming chamber, the flow of air outward through the open bottom of the forming chamber can be controlled. For example, closing the dampers results in the entire amount of air discharged into the forming chamber by annular manifold 54 being forced out the bottom of the forming chamber.

Where the fiber-forming method and apparatus of this invention utilizes a plurality of openings for the exit of air, each opening can be individually controlled. The control of the exit of air through an individual opening will control the air flow in the region of the forming chamber adjacent that opening. Thus, the method and apparatus of this invention can be used for control of the temperature of localized areas within the forming chamber. The control of localized areas within the forming chamber results in the ability to control the temperature pattern on the bushing bottom wall itself. For example, if a particular bushing bottom wall in apparatus according to this invention has a hot spot on one end, the exit flow of air through the opening nearest the hot spot can be increased. The increase in air flow adjacent the hot spot will have a cooling effect on the hot spot, resulting in a more desirable temperature pattern on the bushing bottom wall.

It will be evident from the foregoing that various modifications can be made to this invention. However, such are considered as to be within the scope of the invention.

I claim:

1. A method of making fibers from molten mineral material comprising:
    (a) attenuating fibers from a bushing, said bushing having a bottom wall adapted with a plurality of orifices;
    (b) directing a fluid toward said bushing bottom wall from a fluid supply means;
    (c) educting a portion of said fluid from a locus intermediate said bushing bottom wall and said fluid supply means; and,
    (d) recovering said fibers.

2. The method of claim 1 in which the educting of said fluid is controlled.

3. The method of claim 2 in which said bushing bottom wall has a sidewall projecting downwardly and said portion of the fluid is educted through an opening in said sidewall and in which a pressure differential is established across said opening.

4. The method of claim 3 wherein said sidewall is adapted with a plurality of openings, said openings being adapted with means for controlling the amount of fluid passing therethrough.

5. The method of claim 4 wherein portions of said bottom wall are at unlike temperatures and the quantity of fluid exiting from said openings is controlled responsive to said temperatures.

6. The method of claim 1 in which a portion of the educted fluid is redirected toward said bushing bottom wall.

7. A method of making fibers from molten mineral material comprising:
    a. attenuating fibers from a bushing, said bushing having a bottom wall adapted with a plurality of orifices through which said fibers are drawn, and portions of said bottom wall being at unlike temperatures;
    b. directing a fluid toward said bushing bottom wall;
    c. educting a portion of said fluid from said bottom wall through a plurality of means for educting; and,
    d. controlling the flow of fluid through said means for educting responsive to said temperatures.

8. A method of making fibers from molten mineral material comprising:
    a. attenuating fibers from a bushing, said bushing having a bottom wall adapted with a plurality of orifices through which said fibers are drawn;
    b. directing a fluid toward said bottom wall;
    c. educting at least a portion of said fluid from said bottom wall; and,
    d. redirecting some of the educted fluid toward said bottom wall.

9. In a bushing for making fibers from molten mineral material, said bushing having a bottom wall containing a plurality of orifices through which said fibers are drawn, sidewalls extending continuously downwardly from said orificed bottom wall to create an open-bottomed forming chamber through which said fibers pass, fluid supply means positioned to direct a flow of fluid toward said bottom wall of said bushing, and at least one opening positioned in said sidewalls of said forming chamber for the exit of at least a portion of said fluid, said opening being positioned intermediate said fluid supply means and said bottom wall.

10. The apparatus of claim 9 in which said opening is adapted with means for controlling the exit of fluids from said chamber through said opening.

11. The apparatus of claim 10 wherein said means for controlling comprises a damper.

12. The apparatus of claim 10 wherein said means for controlling comprises a means for creating a pressure differential across said opening.

13. The apparatus of claim 1 wherein said fluid supply means comprises at least one nozzle and a source of fluid, and wherein one of said openings is positioned in said sidewall for each of said nozzles.

14. The apparatus of claim 1 wherein said apparatus comprises means for removing said fluid from said forming chamber and returning said removed fluid to said fluid supply means.

15. The apparatus of claim 1 wherein said fluid supply means comprises a manifold surrounding said forming chamber, said manifold having at least one manifold opening for directing said flow of fluid toward said bushing, said sidewall opening being positioned in said sidewall above said manifold opening.

16. The apparatus of claim 1 wherein said bushing bottom wall protrudes downwardly into said forming chamber.

17. In a bushing for making fibers from molten mineral material, said bushing having a bottom wall containing a plurality of orifices through which said fibers are drawn, portions of said bottom wall being at unlike temperatures, fluid supply means positioned to direct a flow of fluid toward said bottom wall, a plurality of means for educting at least a portion of said fluid, and means for controlling the flow of fluid through the educting means responsive to said temperatures.

18. In a bushing for making fibers from molten mineral material, said bushing having a bottom wall containing a plurality of orifices through which said fibers are drawn, fluid supply means positioned to direct a flow of fluid toward said bottom wall, means for educting at least a portion of said fluid from said bottom wall, and means for redirecting some of the educted fluid toward said bottom wall.

19. In a bushing for making fibers from molten mineral material, said bushing having a bottom wall containing a plurality of orifices through which said fibers are drawn, fluid supply means positioned to direct a flow of fluid toward said bottom wall, and means for educting at least a portion of said fluid from said bottom wall, said means for educting being positioned intermediate said bottom wall and said fluid supply means.

* * * * *

UNITED STATES PATENT AND TRADEMARK OFFICE
CERTIFICATE OF CORRECTION

PATENT NO. : 4,227,906
DATED : October 14, 1980
INVENTOR(S) : ELMER P. RIESER

It is certified that error appears in the above—identified patent and that said Letters Patent is hereby corrected as shown below:

Column 5, line 21 should read:
    13. The apparatus of claim 9 wherein said fluid supply Column 5, line 25 should read:
    14. The apparatus of claim 9 wherein said apparatus Column 5, line 29 should read:
    15. The apparatus of claim 9 wherein said fluid supply Column 6, line 3 should read:
    16. The apparatus of claim 9 wherein said bushing Signed and Sealed this Twenty-fourth Day of November 1981

[SEAL]

Attest:

GERALD J. MOSSINGHOFF

Attesting Officer     Commissioner of Patents and Trademarks